Oct. 29, 1940.   G. E. RIEDER   2,219,963
FRUIT AND VEGETABLE CUTTING APPARATUS
Original Filed Dec. 12, 1938   2 Sheets-Sheet 1
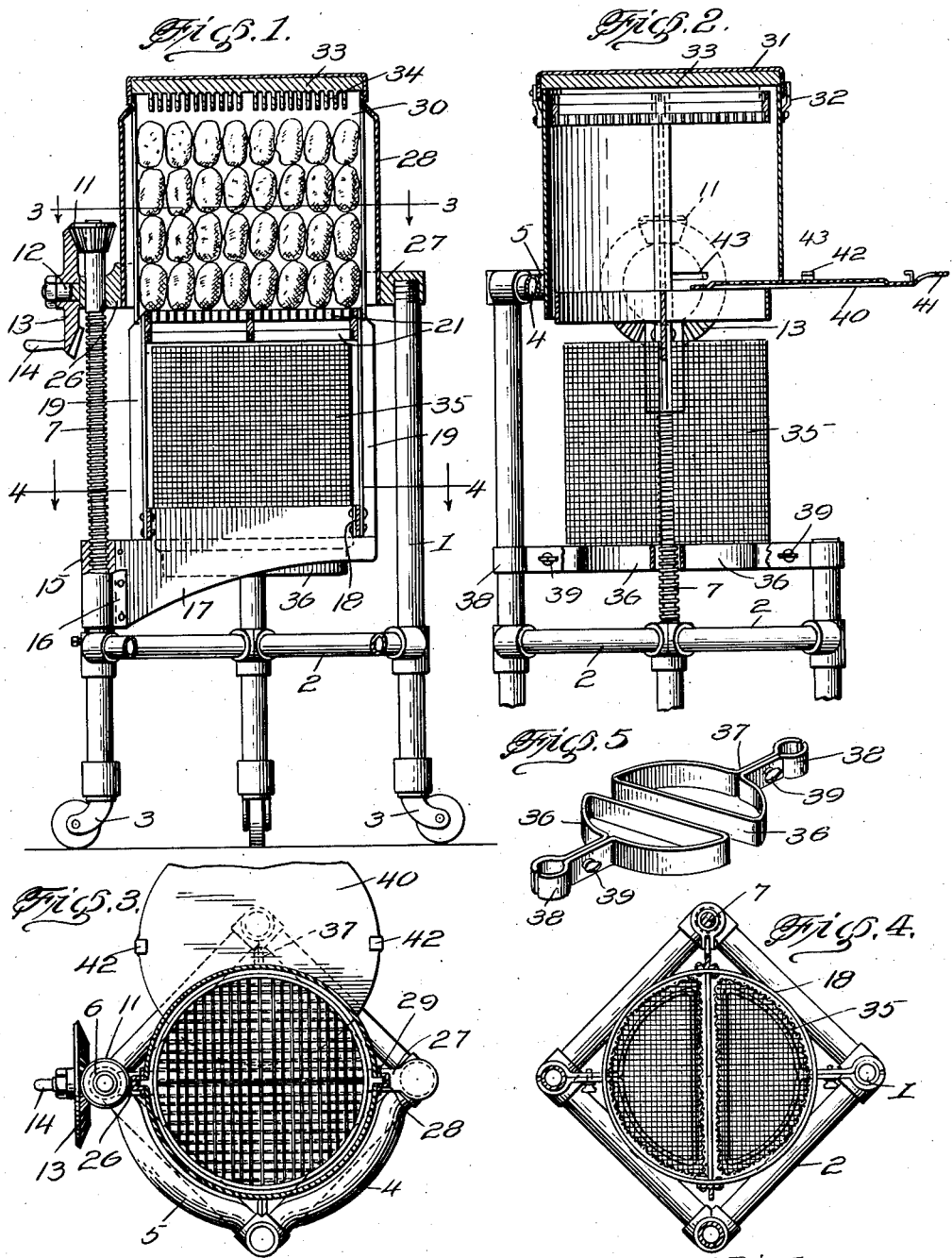
George E. Rieder, INVENTOR
BY Victor J. Evans & Co.
ATTORNEYS
WITNESS

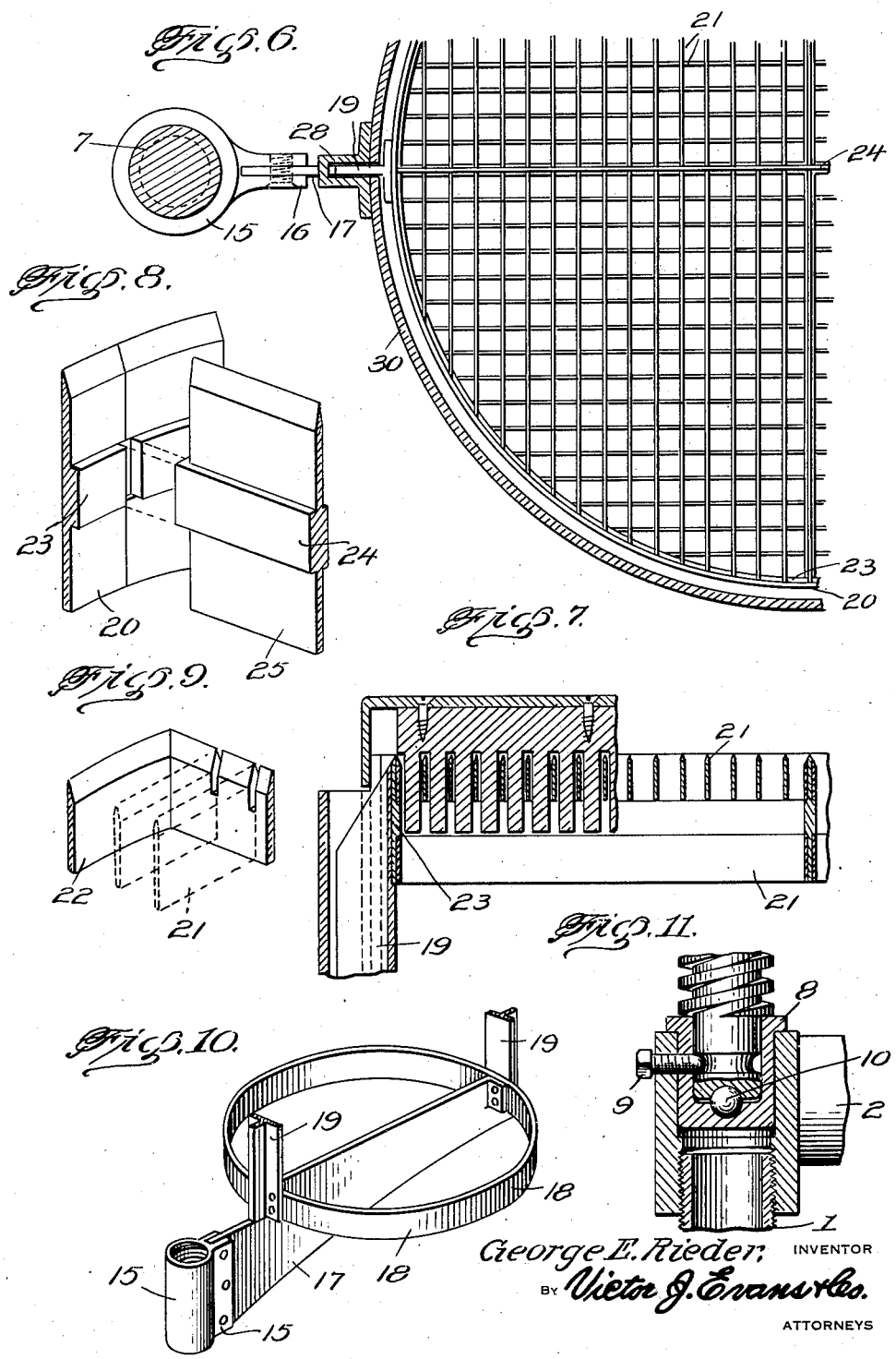

Patented Oct. 29, 1940

2,219,963

UNITED STATES PATENT OFFICE 2,219,963

FRUIT AND VEGETABLE CUTTING APPARATUS

George E. Rieder, Baltimore, Md.

Application December 12, 1938, Serial No. 245,312
Renewed March 27, 1940

3 Claims. (Cl. 146—160)

This invention relates to fruit and vegetable cutting apparatus, and its general object is to provide an apparatus that is capable of slicing and dicing fruits and vegetables in bulk and predetermined large quantities, as distinguished from the devices now in use which have the capacity of only a single piece of fruit or vegetable, that is only one can be cut at a time, therefore it will be obvious that my apparatus which can be operated in an easy and expeditious manner, with minimum effort on the part of the user will be extremely desirable and advantageous for use in hotels, restaurants and like places where large quantities of food are prepared.

A further object is to provide a cutting apparatus of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a vertical sectional view taken through the apparatus which forms the subject matter of the present invention, with parts in elevation, and illustrates the material receiving chamber loaded and the cutter in lowered position.

Figure 2 is a similar view taken at right angles to Figure 1, with the cutter in raised position.

Figure 3 is a view taken approximately on line 3—3 of Figure 1, looking in the direction of the arrows.

Figure 4 is a sectional view taken approximately on line 4—4 of Figure 1, looking in the direction of the arrows.

Figure 5 is a perspective view of the dual basket supports.

Figure 6 is an enlarged fragmentary horizontal sectional view taken through the cutter assembly and illustrates the blades and frames therefor in elevation.

Figure 7 is an enlarged fragmentary sectional view illustrating the relation of the blades with respect to the blade receiving or cutting block.

Figures 8 and 9 are enlarged fragmentary detail perspective views of the blades and frames therefor.

Figure 10 is a view of the cutter carrier in section.

Figure 11 is a fragmentary sectional view of the mounting for the worm screw for the cutter carrier.

Referring to the drawings in detail, it will be noted that my cutter includes a supporting frame that is shown as being made up of pipe sections, to provide uprights 1 and lower cross members 2. The uprights have casters 3 secured thereto in the form as shown, to render the apparatus easily portable, but it will be understood that the casters may be eliminated, if desired.

There are four uprights in the form as shown, two of which are disposed a considerable distance above the others and bridging the upper ends thereof is a cross member 4, while extending from the upper end of one of the uprights is a cross member 5 having secured to its outer end a bearing block 6 which has mounted therein the upper end of a worm screw 7 that has its lower end mounted in a cup bearing 8 secured in the upper end of the nipple of a short upright, as clearly shown in Figure 11. The lower end of the worm screw is provided with an annular groove having the inner end of a set screw 9 mounted therein and which secures the cup bearing within the nipple, and the bottom of the cup bearing, as well as the worm screw have recesses therein for receiving a ball bearing 10, so that the worm screw will be mounted on the bearing for free rotation, as will be apparent.

In order to rotate the worm screw, the upper end has keyed or otherwise secured thereto a pinion 11 and secured to and extending outwardly from the bearing block 6 is a stub shaft 12 that has rotatably mounted thereon a beveled gear 13 meshing with the pinion 11, as shown in Figure 1, the beveled gear having a handle 14 secured thereto.

Mounted for travel on the worm screw 7 is a worm nut 15 in the form of a sleeve which includes spaced parallel flanges 16, between which is secured a flat bracket arm 17 extending diametrically of the supporting frame, as shown in Figure 1.

The arm 17 preferably has ears struck from adjacent the ends thereof to provide shoulders having mounted thereon and fixed to the ears, as clearly shown in Figure 10, a ring band 18 and secured to and rising from the band upon diametrically opposite sides thereof, are cross sectional T-shaped guide members 19 which have the upper ends beveled as best shown in Figure 7, and secured to the upper ends for disposal in superimposed relation with respect to the ring band 18 is a similar ring band 20, but the latter provides an outer frame for the cutting means.

The cutting means are shown as including superimposed sets of blades 21, with the blades of one set being arranged at right angles with respect to the blades of the other set, but the blades of each set are disposed in spaced parallel relation relative to each other and are mounted in quadrant frames 22 seated against ribs 23 disposed about the circumferential center of the ring band 20 and ribs 24 disposed along the longitudinal center of the cross members 25 arranged in diametrically bridging relation with respect to the band 20, as clearly shown in Figure 6. The upper edges of the blades, quadrant frames, ring band 20 and cross members 25 are beveled to provide cutting edges, as clearly shown in Figures 8 and 9.

Formed on and extending inwardly from the bearing block 6, is a bracket 26 and a like bracket 27 is secured to the upper end of the upright 1 directly opposite the bearing 6, the brackets 26 and 27 having recessed inner ends within which are secured the lower ends of parallel cross sectional U-shaped tracks 28 having mounted for slidable movement therein the T-shaped guide members 19 for the cutting means. The tracks 28 are provided with outwardly directed flanges 29 and secured to the flanges as best shown in Figure 3 are the side edges of semi-cylindrical members that cooperate with each other to provide what may be termed a container 30 having open upper and lower ends, as best shown in Figure 2, and the upper end is closed by a flanged cover 31 removably fixed to the container, by suitable fastening means 32 such as hook and stud connections as shown in Figure 2. Secured to the inner surface of the cover for disposal in the path of the upper set of cutting blades is a disk block 33 that is grooved as at 34 for receiving the blades, as best shown in Figure 2.

Supported below the container for receiving the cut material is a pair of metal baskets 35, preferably made from wire mesh material and having flat inner faces disposed in spaced relation with respect to each other to allow for the passage of the bracket arm 17 between the same, as will be apparent, and the baskets 35 are supported upon the semi-circular body portions 36 of bracket members which include shanks 37 terminating at their outer ends into split collars 38 secured to diametrically opposed uprights by thumb screws 39, it being noted as best shown in Figure 5 that each of the supporting brackets may be formed from a single strip of strap metal, and that they are likewise spaced from each other, as best shown in Figure 2, to allow for the passage of the bracket arm 17 between the same.

Removably associated with the container 30 is what I term a loading tray 40 that acts as a support for the material to be cut. The tray includes a handle 41 to facilitate the application and removal thereof with respect to the lower end of the container and formed on the periphery of the tray and rising therefrom are right angle latching lugs 42 receivable in slots 43 in the container for supporting the tray, as will be apparent.

From the above description and disclosure of the drawings, it is believed that the operation of my apparatus will be obvious, but it might be mentioned that when the cutting means is arranged in its lowermost position as shown in Figure 1, the loading tray is applied to the container, thence the container is filled with material to be cut, such as potatoes as indicated in Figure 1, and the cover 31 is then fixed in position. The tray is then removed so that the lowermost row of material will rest upon the upper set of cutting blades. The beveled gear 13 is then rotated by its handle as will be apparent, to cause the cutting means to travel upwardly through the potatoes for cutting the same into elongated pieces, which will fall within the baskets 35. While I have illustrated cutting means that include two sets of knives, it will be obvious that only one set may be employed, for cutting the material in slices.

It will be further obvious that the apparatus can be made in various sizes that is from a bushel capacity size to a smaller quantity, and in any event the material to be cut, such as potatoes are stacked one upon the other, so that any quantity within the container can be cut at one time, for example assuming that the container for the bushel capacity size is fully loaded, the cutting means can be elevated to a height for cutting a quarter bushel, and later on another quarter bushel and so on. If desired, the screw 7 may be marked with suitable indicating means, such as "¼," "½" and "¾," representing the respective parts of a bushel, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A cutting apparatus comprising a supporting frame, handled screw means mounted on the frame and including a worm nut, a bracket arm secured to the worm nut and extending into the frame, superimposed ring bands and the lower band being fixed to the bracket arm, guide members rising from the lower band and having the upper band secured to the upper ends thereof, cutting means mounted in the upper band, tracks slidably receiving the guide members and secured to the frame, a container for receiving material to be cut and secured to the tracks for receiving the cutting means therein, means for receiving the cut material, and means secured to the frame for supporting the cut material receiving means.

2. A cutting apparatus comprising a wheeled supporting frame, means mounted within the frame for reciprocation, means for actuating the reciprocating means, cutting means carried by the reciprocating means and including a ring band, sets of cutting blades disposed in superposed relation with respect to each other within the ring band and the blades of one set disposed at right angles to the blades of the other set, quadrant frames having the blades fixed thereto with the blades of each frame disposed in parallel relation with each other, a container for receiving material to be cut and having an open lower end for the passage of the cutting means therein, a removable cover closing the upper end of the container, a block within the cover and arranged within the path of the cutting means, means removably mounted in the container for initially supporting the material therein, and means for receiving the cut material and removably supported below the container.

3. A cutting apparatus comprising a supporting frame, means mounted within the frame for reciprocation, screw means for actuating the reciprocating means, cutting means carried by the reciprocating means, a container for receiving material to be cut and having an open lower end for the passage of the cutting means therein, a removable cover closing the upper end of the container, a block within the cover and being grooved for receiving the cutting means, a loading tray removably mounted in the lower end of the container for initially closing the same, supporting brackets secured to the frame and extending inwardly therefrom, and semi-circular baskets for receiving the cut material to rest upon the supporting brackets in spaced relation with respect to each other to allow for the passage of the reciprocating means between the same.

GEORGE E. RIEDER.